US012086699B2

United States Patent
Kapicioglu et al.

(10) Patent No.: US 12,086,699 B2
(45) Date of Patent: Sep. 10, 2024

(54) VENUE DETECTION

(71) Applicant: FOURSQUARE LABS, INC., New York, NY (US)

(72) Inventors: Cagatay Berk Kapicioglu, New York, NY (US); Enrique Cruz, New York, NY (US); Aaron Mitchell, New York, NY (US); Stephanie Yang, New York, NY (US)

(73) Assignee: FOURSQUARE LABS, INC., New York, NY (US)

( * ) Notice: Subject to any disclaimer, the term of this patent is extended or adjusted under 35 U.S.C. 154(b) by 0 days.

(21) Appl. No.: 18/049,081

(22) Filed: Oct. 24, 2022

(65) Prior Publication Data

US 2023/0135252 A1 May 4, 2023

Related U.S. Application Data (63) Continuation of application No. 15/689,683, filed on Aug. 29, 2017, now Pat. No. 11,481,690.

(Continued)

(51) Int. Cl.
*G06N 7/01* (2023.01)
*G06F 16/29* (2019.01)
(Continued)

(52) U.S. Cl.
CPC .............. *G06N 20/20* (2019.01); *G06F 16/29* (2019.01); *G06N 20/00* (2019.01); *H04W 4/021* (2013.01);
(Continued)

(58) Field of Classification Search
CPC .......... G06N 20/20; G06N 20/00; G06N 7/01; G06F 16/29; H04W 4/021; H04W 4/38; G06Q 30/0201; Y02D 30/70
See application file for complete search history.

(56) References Cited

U.S. PATENT DOCUMENTS 9,253,596 B2 2/2016 Sridhara et al.
9,860,704 B2 1/2018 Kapicioglu et al.
(Continued)

FOREIGN PATENT DOCUMENTS

JP 2004-112482 A 4/2004
JP 2007-336486 A 12/2007
(Continued)

OTHER PUBLICATIONS

EP communication pursuant to Article 94(3) for EP 17851530.0 dated Feb. 23, 2021, pp. 1-7.
(Continued)

*Primary Examiner* — Robert T Nguyen (57) ABSTRACT

Examples of the present disclosure describe systems and methods for venue detection. In aspects, a mobile device comprising a set of sensors may collect and store sensor data from in response to a detected movement event or user interaction data. The sensor data may be used to generate a set of candidate venues corresponding to the location of the mobile device. The candidate venues may be provided to a venue detection system. The venue detection system may process the candidate venues to generate a set of features. The set of features may be applied to, and/or used to generate, one or more probabilistic models. The probabilistic models may generate confidence metrics for each of the candidate venues. In some aspects, the top 'N' venues may be selected from the set. The top 'N' venues may then be presented to the user and/or used to effect one or more actions.

20 Claims, 4 Drawing Sheets

Related U.S. Application Data (60) Provisional application No. 62/395,827, filed on Sep. 16, 2016.

(51) Int. Cl.
  *G06N 20/00* (2019.01)
  *G06N 20/20* (2019.01)
  *H04W 4/021* (2018.01)
  *H04W 4/38* (2018.01)
  *G06Q 30/0201* (2023.01)

(52) U.S. Cl.
  CPC .......... *G06N 7/01* (2023.01); *G06Q 30/0201* (2013.01); *H04W 4/38* (2018.02); *Y02D 30/70* (2020.08)

(56) References Cited

U.S. PATENT DOCUMENTS

| | | | |
|---|---|---|---|
| 10,114,901 B2 | 10/2018 | Mitrovic | |
| 10,185,973 B2 | 1/2019 | Priness et al. | |
| 11,085,663 B2 | 8/2021 | Ellis et al. | |
| 11,481,690 B2* | 10/2022 | Kapicioglu | G06N 20/00 |
| 2012/0020979 A1 | 1/2012 | Cerutti et al. | |
| 2012/0284212 A1* | 11/2012 | Lin | G06N 20/00 |
| | | | 706/12 |
| 2012/0307645 A1 | 12/2012 | Grosman et al. | |
| 2013/0022685 A1 | 1/2013 | Sample et al. | |
| 2013/0110481 A1 | 5/2013 | Sullivan et al. | |
| 2013/0226857 A1 | 8/2013 | Shim et al. | |
| 2013/0325746 A1 | 12/2013 | Kapicioglu et al. | |
| 2013/0325855 A1* | 12/2013 | Kapicioglu | G06F 16/9537 |
| | | | 707/724 |
| 2013/0336138 A1 | 12/2013 | Venkatraman et al. | |
| 2014/0358836 A1* | 12/2014 | Moore | H04L 67/535 |
| | | | 706/46 |
| 2015/0003267 A1 | 1/2015 | Francis | |
| 2015/0105098 A1 | 4/2015 | Sridhara et al. | |
| 2015/0149393 A1 | 5/2015 | Hwang | |
| 2015/0248436 A1 | 9/2015 | Podemsky et al. | |
| 2016/0019465 A1 | 1/2016 | Milton et al. | |
| 2016/0066150 A1 | 3/2016 | Chao et al. | |
| 2016/0300263 A1* | 10/2016 | Priness | H04W 4/02 |
| 2016/0350812 A1* | 12/2016 | Priness | G06Q 50/10 |
| 2016/0358065 A1* | 12/2016 | Gedge | G06N 20/00 |
| 2016/0360377 A1 | 12/2016 | Lovich et al. | |
| 2017/0032248 A1* | 2/2017 | Dotan-Cohen | G06Q 10/06 |
| 2017/0124465 A1 | 5/2017 | Yang et al. | |
| 2018/0082206 A1 | 3/2018 | Yang et al. | |
| 2019/0287121 A1 | 9/2019 | Waksman et al. | |
| 2019/0385738 A1 | 12/2019 | Hoelzer et al. | |
| 2020/0138360 A1 | 5/2020 | Fan et al. | |
| 2020/0226504 A1 | 7/2020 | Keng et al. | |
| 2020/0356900 A1 | 11/2020 | Briancon et al. | |
| 2021/0136514 A1 | 5/2021 | Shaposhnikov et al. | |

FOREIGN PATENT DOCUMENTS

| | | | |
|---|---|---|---|
| JP | 2009-159336 A | | 7/2009 |
| JP | 2011-059924 A | | 3/2011 |
| JP | 2015-002388 A | | 1/2015 |
| JP | 5933863 B1 | | 6/2016 |
| KR | 10-2014-0000566 A | | 1/2014 |
| WO | 02/93877 A1 | | 11/2002 |
| WO | 2012/042814 A1 | | 4/2012 |

OTHER PUBLICATIONS

European Patent Application No. 17851530.0, Communication pursuant to Article 94(3) EPC dated Feb. 23, 2021, 7 pages.
Extended European Search Report dated Apr. 3, 2020 for EP Application No. 17851530.0, 8 pages.
Lee, et al., Multiswitch Hidden Markov Models for Route and Destination Prediction of Mobile Phone Users, 2013, pp. 351-355.
Non-Final Rejection dated May 1, 2020 for U.S. Appl. No. 15/704,899, 12 pages.
Notice of Allowance issued in JP 2019-536475 dated Jun. 6, 2022, pp. 1-4.
Office Action for JP 2019-536471, dated Aug. 16, 2021, pp. 1-6.
Office Action for JP2019-536475, dated Nov. 1, 2021, pp. 1-11.
Office Action for KR2019-7010855, dated Feb. 3, 2022, pp. 1-6.
PCT International Preliminary Report on Patentability in PCT/US2017/051568, dated Mar. 19, 2019, 10 pages.
PCT International Preliminary Report on Patentability in PCT/US2017/051879, dated Mar. 19, 2019, 12 pages.
PCT International Search Report and Written Opinion in PCT/US2017/051568, dated Dec. 22, 2017, 13 pages.
PCT International Search Report and Written Opinion in PCT/US2017/051879, dated Dec. 22, 2017, 16 pages.
U.S. Appl. No. 15/704,899, Notice of Allowance dated Jan. 14, 2021, 12 pages.

* cited by examiner

VENUE DETECTION

CROSS-REFERENCE TO RELATED APPLICATIONS

This application claims priority from provisional U.S. Application Ser. No. 62/395,827, filed Sep. 16, 2016, entitled "PASSIVE VISIT DETECTION," which application is incorporated herein by reference in its entirety.

BACKGROUND

Venue detection systems enable determinations related to mobile device visit patterns. In many cases, the venue detection systems rely almost exclusively on periodic geographic coordinate system data (e.g., latitude, longitude and/or elevation coordinates) to determine the location of a mobile device. For example, the geographic coordinate system data may be used to determine whether a detected stop by a mobile device correlates with a check-in event by the mobile device user at a particular venue. However, the almost exclusive use of geographic coordinate system data may result in inaccurate venue detection.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for venue detection. In aspects, a mobile device comprising a set of sensors may collect and store sensor data from the set of sensors in response to detecting a movement event or user interaction data. The sensor data may be used to generate a set of candidate venues corresponding to the location of the mobile device. The candidate venues may be provided to a venue detection system. The venue detection system may process the candidate venues to generate a set of features. The set of features may be applied to, and/or used to generate, one or more probabilistic models. The probabilistic models may generate confidence metrics for each of the candidate venues. In some aspects, the top 'N' venues may be selected from the set. The top 'N' venues may then be presented to the user and/or used to effect one or more actions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describe systems and methods for venue detection. In aspects, venue detection maybe described with respect to passive visit detection. Passive visit detection refers to the use of implicit indicia to determine whether a mobile device (or a user thereof) is visiting, or has visited, a particular venue or geographic location. As opposed to active visit detection, which uses explicit user signals (such as user-confirmed venue check-in data), passive visit detection relies on the passive collection of data from various sensors of a mobile device. The analysis of data from various mobile device sensors increases the accuracy and efficiency of visit detections over conventional approaches that only use geographic coordinate system data. Although the venue detection techniques described herein are described with respect to passive visit detection, one of skill in the art will recognize that such techniques may also be applied in other contexts.

In aspects, a mobile device may comprise one or more sensors. Exemplary sensors may include GPS sensors, Wi-Fi sensors, proximity sensors, accelerometers, ambient temperature sensors, gyroscopes, light sensors, magnetometers, hall sensors, acoustic sensors, a touchscreen sensor, etc. The mobile device may monitor data detected by the sensors as the mobile device is used and/or transported by a user. The mobile device may also detect events, such movement events, purchase events, information delivery events, venue check-in events, etc. In some aspects, the detection of an event may cause the sensor data to be collected and processed. Processing the sensor data may include parsing the sensor data to identify one or more venues and/or associated venue data. The identified venues/venue data may be analyzed to identify a set of candidate venues corresponding to events and/or user activity in a geo-fenced area. Geofencing, as used herein, may refer to dynamically generating a virtual perimeter around the geographical location of a mobile device. The set of candidate venues may be analyzed to determine a set of features. The set of features may be used to generate one or more feature vectors for each candidate venue. A feature vector, as used herein, may refer to an n-dimensional vector of numerical features that represent one or more objects. The feature vectors may be applied to, or used to generate, one or more data evaluation utilities, such as decision logic, one or more rule sets, or machine learning models. A model, as used herein, may refer to a predictive or statistical language model that may be used to determine a probability distribution over one or more character sequences, classes, objects, result sets or events, and/or to predict a response value from one or more predictors. In examples, a model may be a rule-based model, a machine-learning regressor, a machine-learning classifier, a neural network, or the like.

In aspects, the data evaluation utilities may use feature vectors to generate confidence metrics for a list of candidate venues. The confidence metrics may be indicative of the likelihood a candidate venue corresponds to a particular set of coordinates or an event. In examples, the list of candidate venues may be ranked according to one or more criteria (such as confidence metrics), and presented via a user interface. In some aspects, the list of candidate venues may be calibrated to increase the accuracy and/or confidence of the candidate venue selections, or reduce the number of candidate venue selections. The calibration may include the use of heuristics and one or more threshold value comparisons. In examples, the calibration may result in a selection of the top 'N' venues from the list of candidate venues. One or more of the top 'N' venues may be presented to a user via a display interface. The display interface may provide for receiving one or more user selections. The user selection may be used to further calibrate the list of top 'N' venues.

Accordingly, the present disclosure provides a plurality of technical benefits including but not limited to: detecting passive visit events; enabling venue-based geo-fencing; enabling the collection venue/location data using various mobile device sensors; enabling the collection venue data and user data from one or more data stores, generating venue-based feature vectors; applying machine learning techniques to determine probabilities for a list of venues; refining venue selection using user-based denial information; improving the measurement of relative visit totals between venues; calibrating venue lists to remove low probability venues; evaluating the accuracy of probabilistic models using objective functions; and improved efficiency and quality for applications/services utilizing examples of the present disclosure, among other examples.

Figure 1:
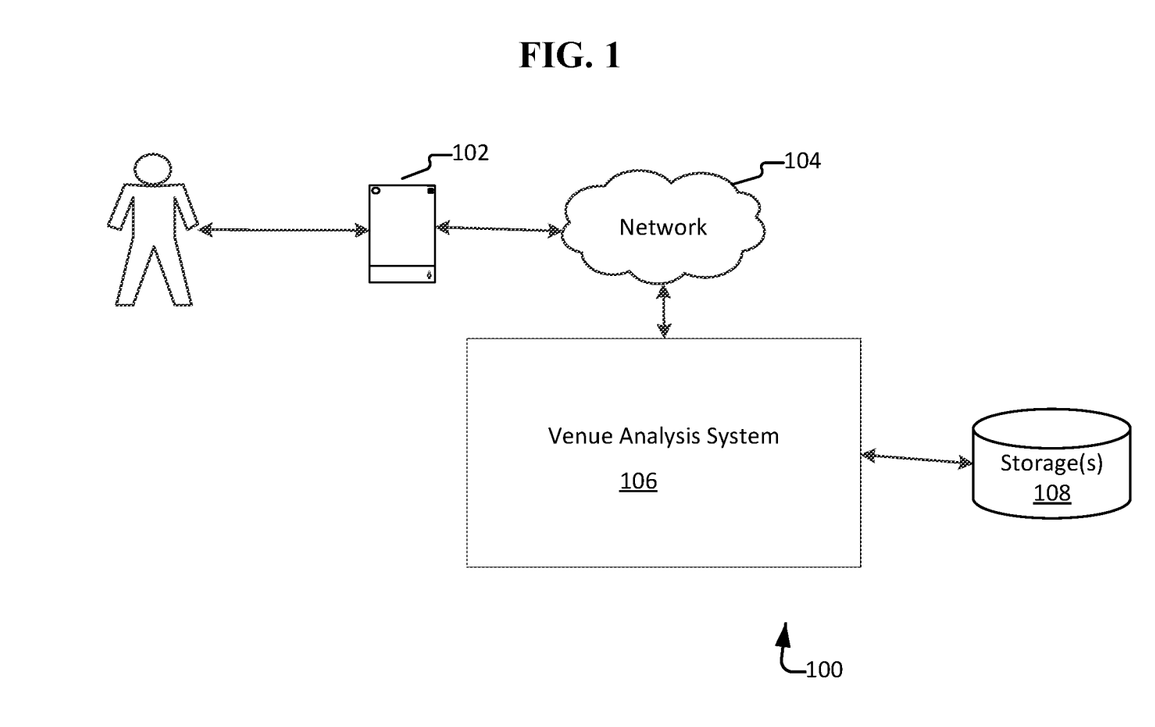
FIG. 1 illustrates an overview of an example system for venue detection as described herein.

FIG. 1 illustrates an overview of an example system for venue detection as described herein. Example system 100 presented is a combination of interdependent components that interact to form an integrated whole for venue detection systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 4. In other examples, the components of systems disclosed herein may be spread across multiple devices. For instance, input may be entered on a client device and information may be processed or accessed from other devices in a network, such as one or more server devices.

As one example, the system 100 comprises client device 102, distributed network 104, venue analysis system 106 and a storage 108. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

Client device 102 may be configured to collect sensor data related to one or more venues. In aspects, client device 102 may comprise, or have access to, one or more sensors. The sensors may be operable to detect and/or generate sensor data for client device 102, such as GPS coordinates and geolocation data, positional data (such as horizontal and/or vertical accuracy), Wi-Fi information, OS information and settings, hardware information, signal strengths, accelerometer data, time information, etc. Client device 102 may collect and process the sensor data. In some aspects, client device 102 may collect and/or process sensor data in response to detecting an event or the satisfaction of one or more criteria. For instance, sensor data may be collected in response to a detected stop by client device 102. In examples, detecting a stop may include the use of one or more machine learning techniques or algorithms, such as expectation-maximization (EM) algorithms, Hidden Markov Models (HMMs), Viterbi algorithms, forward-backward algorithms, fixed-lag smoothing algorithms, Baum-Welch algorithms, etc. Collecting the sensor data may include aggregating data from various sensors, organizing the data by one or more criteria, and/or storing the sensor data in a data store (not shown) accessible to client device 102. The collected sensor data may be provided to (or be accessible by) an analysis utility, such as venue analysis system 106, via distributed network 104.

Venue analysis system 106 may be configured to produce one or more venue lists. In aspects, venue analysis system 106 may have access to one or more sets of sensor data. Venue analysis system 106 may process the sensor data to identify a candidate set of venues. Processing the sensor data may comprise parsing the sensor data to identify one or more locations of client device 102. The one or more locations of client device 102 may be applied to a classification algorithm, such as a k-nearest neighbor algorithm, to fetch a candidate set of venues. The k-nearest neighbor algorithm, as used herein, may refer to a classification (or regression) technique wherein an object is classified by a majority vote of its neighbors, with the object being assigned to the class most common among its k nearest neighbors. In examples, the candidate set of venues generated using the classification algorithm may comprise venues near to, or within a specific proximity of, a location reported for client device 102.

Venue analysis system 106 may be further configured to generate one or more feature vectors. In aspects, venue analysis system 106 may generate a feature vector for one or more venues in a candidate set of venues. Generating a feature vector may comprise combining sensor data associated with a venue with information from one or more knowledge sources. In examples, the information may include historical and/or predicted venue and user data. Venue analysis system 106 may evaluate the feature vectors using one or more probabilistic data models or predictive algorithms, such as a decision tree. A non-exhaustive list of decision tree learning techniques include classification trees, regression trees, boosted trees, bootstrap aggregated trees, rotation forests. In examples, evaluating the feature vectors may include the use of one or more gradient boosting techniques. Gradient boosting, as used herein, may refer to one or more machine learning techniques for classification and regression, which produces a prediction model in the form of an ensemble of weak prediction models. The gradient boosting may incorporate factors such as venue age, venue popularity, proximity to other venues, historical accuracy of venue choices/selections, previous venue visits, implicit/explicit user feedback, etc. The evaluation of the feature vectors may result in the calculation of scores or probabilities for the venues in the candidate set of venues. The scores/probabilities may be assigned to feature vector (or features thereof), or assigned to the corresponding venues in the candidate set of venues. Such scores/probabilities may represent the likelihood that a venue corresponds to location data reported by client device 102. The candidate set of venues, feature vectors and associated feature data, and/or scores/probabilities may be stored in a data store, such as storage(s) 108.

Venue analysis system 106 may be further configured to calibrate the candidate set of venues. In aspects, calibrating the candidate set of venues may comprise evaluating the scores/probabilities for each candidate venue against a threshold value. Venues having scores/probabilities below the threshold value may be removed from the candidate set of venues or diminished in some manner. In examples, determining the threshold value may comprise evaluating one or more sets of heuristics against the candidate set of venues to determine a set of venue visit distribution. The venue visit distribution may comprise one or more of the venues in the candidate set of venues and/or one or more venues associated with a reported location of client device 102. Venue analysis system 106 may compare the set of venue visit distributions (or an aggregated venue visit distribution) to a set of labeled and/or unlabeled training data. Based on the comparison, a threshold value identifying venues with a low likelihood of corresponding to location data reported by client device 102 is determined. In some aspects, calibrating the candidate set of venues may further comprise determining a list of top 'N' venues. The list of top 'N' venues may represent the venue candidates most likely to correspond to the location of a mobile device. In examples, determining the list of top 'N' venues may include evaluating the scores/probabilities for each candidate venue against a threshold value. For instance, the top three (e.g., 'N'=3) venues having the highest scores/probabilities may be selected. In at least one example, the determining the list of top 'N' venues may additionally include receiving user-selection data. For instance, a set of venues may be presented to a user via an interface component accessible to venue analysis system 106. Venue analysis system 106 may receive a selection of one or more venues in the set of venues. The selected venue(s) may represent the top 'N' venue(s). Alternately, the selected venue(s) may represent venues to be removed from the list of top 'N' venues, or an adjustment to the ranking of the list of top 'N' venues. The list of top 'N' venues may be stored in storage(s) 108 and/or presented via a display interface.

Venue analysis system 106 may be further configured to evaluate the accuracy of one or more probabilistic models. In aspects, venue analysis system 106 may have access to a set of training data. The training data may comprise, for example, previously received input data (e.g., sensor data, feature vectors, corresponding feature data, etc.) and/or determined or selected venue outputs. Venue analysis system 106 may apply the input data to one or more probabilistic models. The output of each probabilistic model may be provided to an objective function used to determine the accuracy or effectiveness of the one or more probabilistic models. In examples, the objective function may be defined in myriad ways using various parameters. The objective function may calculate a score representing how closely the output of a probabilistic model matches the corresponding output in the training data. Based on the calculated scores, venue analysis system 106 may rank the one or more probabilistic models. In one example, the highest ranking probabilistic model may be selected for use when a set of feature vectors is received.

Figure 2:
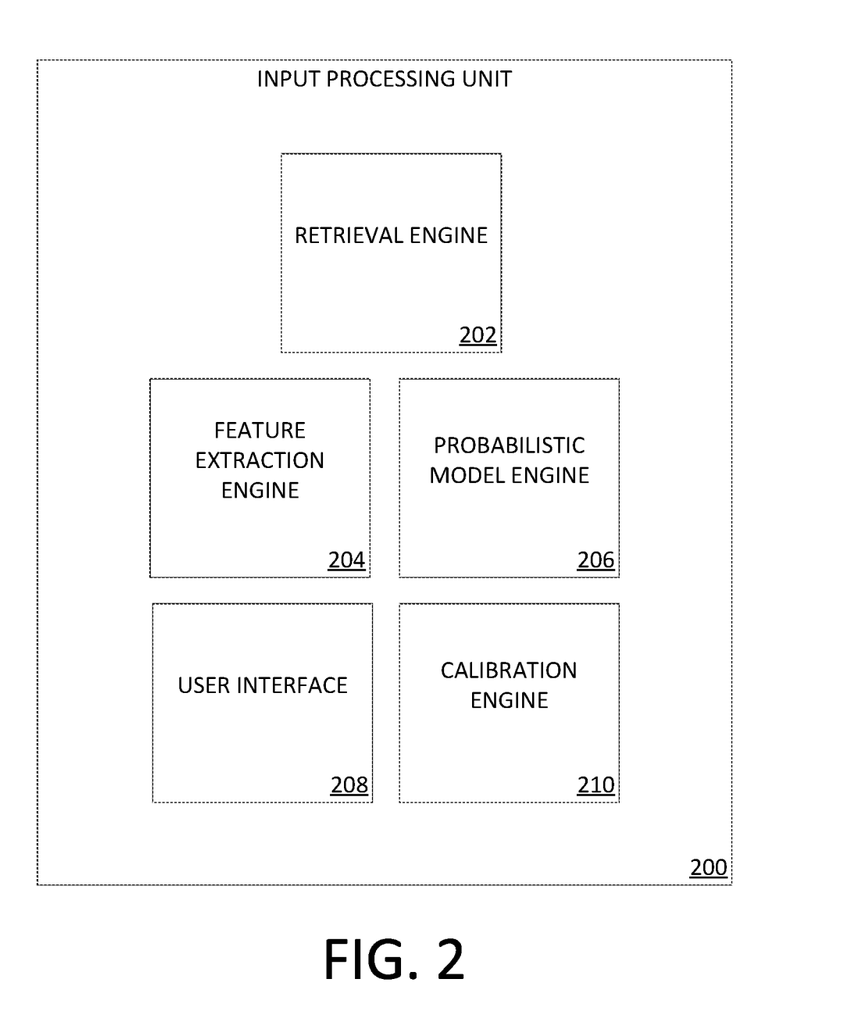
FIG. 2 illustrates an example input processing unit for implementing venue detection as described herein.

FIG. 2 illustrates an overview of an example input processing device 200 for venue detection, as described herein. The venue detection techniques implemented by input processing device 200 may comprise the venue detection techniques and content described in FIG. 1. In alternative examples, a single system (comprising one or more components such as processor and/or memory) may perform processing described in systems 100 and 200, respectively.

With respect to FIG. 2, input processing unit 200 may comprise retrieval engine 202, feature engine 204, probabilistic model engine 206, user interface 208 and calibration engine 210. Retrieval engine 202 may be configured to generate one or more feature sets for a set of sensor data. In aspects, retrieval engine 202 may have access to a set of sensor data collected from a mobile device. The sensor data may represent input from a user or physical environment associated with the mobile device. The sensor data may comprise input collected from various sensors of (or accessible to) the mobile device. In some aspects, retrieval engine 202 may process the sensor data in response to detecting an event or the satisfaction of one or more criteria. For instance, the retrieval engine 202 may receive an indication or otherwise detect that a mobile device has stopped movement. Detecting a stop may comprise sampling sensor data over time, featurizing the sensor data, and applying a stop detection model to the featurized data to determine whether a mobile device has stopped moving. Processing the sensor data may include parsing the sensor data for one or more individual sensors or sensor types to identify venues and/or associated venue data. In aspects, venue data may be used to retrieve a set of candidate venues. For example, the venue data may be applied to a classification algorithm, such as a k-nearest neighbor algorithm. The classification algorithm may determine a list of candidate venues that is within a specific proximity or density distribution of a location reported for a mobile device. In another example, a set of geographical coordinates (or other geolocation identifier) may be provided to a venue determination utility, such as a geographical mapping service. In such an example, the number of venues may depend on the size of the display area presenting the venues.

Feature engine 204 may be configured to generate feature vectors for the list of candidate venues. In aspects, feature engine 204 may have access to the list of candidate venues. Feature engine 204 may correlate each candidate venue to information associated with the candidate venue. For instance, a candidate venue may be correlated to popular nearby venues, similarly named or themed venues, or otherwise related venues. Venue data for the candidate venues and correlated venue data may be identified and used to generate a feature vector for each identified venue. In one example, generating a feature vector may comprise organizing similar features or feature categories, normalizing corresponding feature values, and adding the normalized feature values to a feature vector. In aspects, the feature vector may represent how well the sensor data for a venue matches historical data for that venue. As an example, a mobile device may perform a Wi-Fi scan during a detected stop. The Wi-Fi scan data may be compared to the Wi-Fi scan data of each candidate venue to generate a feature score. The feature score may represent how well the Wi-Fi data matches each of the candidate venues.

Probabilistic model engine 206 may be configured to generate and/or train one or more models. In aspects, probabilistic model engine 206 may have access to one or more feature vectors. Probabilistic model engine 206 may apply one or more gradient boosting techniques to generate a probabilistic model comprising an ensemble of decision trees. The gradient boosting techniques may incorporate factors such as venue age, venue popularity, proximity to other venues, historical accuracy of venue choices/selections, previous venue visits, etc. In at least one example, gradient boosting techniques may also incorporate explicit user feedback. For instance, a result set comprising explicit user confirmations or denials of venue location may also be used to generate probabilistic model 206. In some aspects, a probabilistic model may have access to one or more feature vectors. The feature vectors may comprise feature data and/or feature scores for a candidate set of venues. The probabilistic model may receive the feature vectors as input, and may output a confidence score or probability for each venue in a candidate set of venues. The confidence score/probability may be indicative of the likelihood a venue corresponds to a particular set of coordinates or an event. In at least one example, a probabilistic model may generate a probabilistic distribution for venues in the candidate set of venues. The probabilistic distribution may assign a probability or confidence score to each venue in the venue list using, for example, a probability density function.

In aspects, probabilistic model engine 206 may be further configured to evaluate the accuracy of one or more probabilistic models. Probabilistic model engine 206 may have access to a set of training data comprising, for example, previously received input data (e.g., sensor data, feature vectors, feature scores, etc.), explicit user feedback, labeled venue outputs, venue determination analyses, etc. Probabilistic model engine 206 may apply the input data to one or more probabilistic models. The probabilistic model(s) may have been previously generated, recently generated, or may be generated as part of the evaluation by probabilistic model engine 206. The output of each probabilistic model may be provided to an objective function used to determine the accuracy or effectiveness of the one or more probabilistic models. In examples, the objective function may define the criteria and/or parameters to be evaluated. The objective function may define the number and type of probabilistic model(s) to be evaluated. In aspects, the objective function may compare the output of each probabilistic model with the output in the training data. Based on the comparison, the objective function may calculate a score representing how closely the probabilistic model output matches the training data output. The highest ranking probabilistic model(s) may be recorded and selected for use when feature vectors are subsequently received.

User interface 208 may be configured to present a venue list. In aspects, user interface 208 may enable a user to view, navigate and manipulate a venue list and/or data associated therewith. In examples, user interface 208 may present the venue list as a textual list, a graphical object (e.g., a geographical map or similar visualization), a report, etc. User interface 208 may also provide access to settings or configurations for interacting with the venue list. User interface 208 may be further configured to provide training data to probabilistic model engine 206. In aspects, user interface 208 provide access to one or more sets of training data. The training data may be located locally on input processing unit 200 or on a remote device. In examples, the training data may be labeled or unlabeled input signals. Labeled data may comprise sensor values and corresponding labeled events and venues. The training data may be applied to a probabilistic model to train the probabilistic model to produce a more accurate or relevant venue list. In examples, producing a more accurate or relevant venue list may comprise determining the most relevant or indicative parameter(s)/feature(s) in the set of labeled data. Such a determination may include applying a weight to the parameter(s)/feature(s) and/or removing parameter(s)/feature(s) from the venue list analysis.

Calibration engine 210 may be configured to refine a venue list. In aspects, calibration engine 210 may have access to one or more venue lists. Calibration engine 210 may apply one or more processing techniques to a venue list to increase the accuracy and/or confidence of the venue selections, or reduce the number of venue selections. For example, calibration engine 210 may compare one or more probabilities or confidence scores associated with a candidate set of venues to a threshold value. The threshold value may represent a minimal probability/confidence score for a venue candidate to be included in the candidate set of venues. As a particular example, venues having a probability/confidence score below 1% may be removed from a candidate set of venues. In aspects, a threshold value may be determined or selected by applying, for example, a rule set, a set of heuristics, or other analysis techniques to a candidate set of venues to generate a venue visit distribution. The venue visit distribution may identify the frequency that one or more venues has reported a visit for a period of time. In some aspects, calibration engine 210 may compare the venue visit distributions to a set training data. The training data may comprise labeled or unlabeled venue data, such as venues, check-in information, user data and signals, probabilities/confidence scores, etc. The training data may be used to evaluate venue probabilities/confidence scores and/or visit distributions. Based on the evaluation, a threshold value may be selected. The threshold value may be indicative of a probability/confidence score below which venues have a low likelihood of corresponding to location data reported by a mobile device. The threshold value may be used to determine a list of top 'N' venues. The list of top 'N' venues may represent the venue candidates most likely to correspond to the location of the mobile device. In examples, the top 'N' venues may be determined by selecting a specific number of venue results, selecting venue results above a specific probability threshold, etc.

Figure 3:
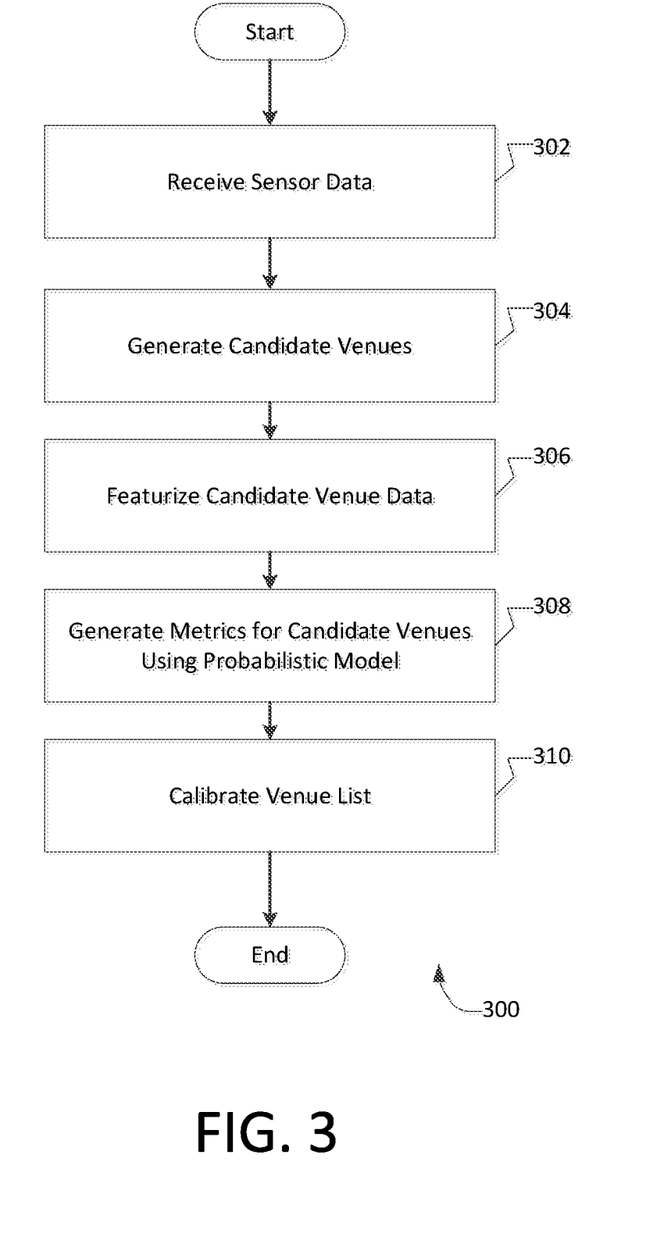
FIG. 3 illustrates an example method for implementing venue detection as described herein.

Having described various systems that may be employed by the aspects disclosed herein, this disclosure will now describe one or more methods that may be performed by various aspects of the disclosure. In aspects, method 300 may be executed by an example system, such as system 100 of FIG. 1. In examples, method 300 may be executed on a device, such as input processing unit 200, comprising at least one processor configured to store and execute operations, programs or instructions. However, method 300 is not limited to such examples. In other examples, method 300 may be performed on an application or service for performing venue detection. In at least one example, method 300 may be executed (e.g., computer-implemented operations)

by one or more components of a distributed network, such as a web service/distributed network service (e.g. cloud service).

FIG. 3 illustrates an example method 300 for venue detection, as described herein. Example method 300 begins at operation 302, where sensor data may be received. In aspects, sensor data from one or more sensors of (or associated with) a mobile device, such as client device 102, may be monitored or collected. The sensor data may comprise information associated with GPS coordinates and geolocation data, positional data (such as horizontal accuracy data, vertical accuracy data, etc.), Wi-Fi data, over the air (OTA) data (e.g., Bluetooth data, near field communication (NFC) data, etc.), OS information and settings, hardware/software information, signal strength data, movement information (e.g., acceleration, time and directional data), etc. The sensor data may be collected continuously, intermittently, upon request, or upon the satisfaction of one or more criteria, such as a detected stop, an appreciable change in movement velocity and/or direction, a check-in, a purchase event, the receipt of a message by the mobile device, or the like.

In aspects, the sensor data may be monitored to identify relevant data points, time frames, movement events and/or venue information. For example, sensor data may be monitored as a mobile device is moving along a storefront. A stop detection utility may monitor the sensor data received by the mobile device. For a first period of time, the stop detection utility may analyze sensor data comprising a Wi-Fi signal (e.g., detection of "Store A" Wi-Fi network) over a successive period of ten polling cycles (e.g., a 10 minute time period). The stop detection utility may determine that, because the Wi-Fi signal was detected during each of the ten polling cycles, the mobile device was continually proximate to Store A. Accordingly, the stop detection utility may determine a visit state of "Visiting" for Store A. In response to the "Visiting" visit state, the stop detection utility may collect and store the sensor data for the first period. For a second period of time, the stop detection utility may analyze sensor data comprising multiple Wi-Fi signals (e.g., detection of "Store A" and "Store B" Wi-Fi networks) and corresponding signal strengths. Based on the sensor data, the stop detection utility may determine the mobile device was proximate to Store B, but the mobile device did not actually enter the store. For instance, Wi-Fi network device for Store B may be 55 feet inside the storefront door. A device may record the signal strength of the "Store B" Wi-Fi network as −80 dBm at a radius of 55 feet from the Wi-Fi network device, −70 dBm at a radius of 25 feet from the Wi-Fi network device and −50 dBm at a radius of 5 feet from the Wi-Fi network device. Over the course of the second period of time, the mobile device may have recorded signal strengths between −85 and −80, indicating the mobile device did not enter Store B. Accordingly, the stop detection utility may determine a visit state of "Traveling" or "Stopped" for Store B. In response to the "Traveling" visit state, the stop detection utility may not collect and store the sensor data for the second period. For a third period of time, the stop detection utility may use accelerometer data, one or more electronic messages (e.g., a text or email advertisement, coupon, event schedule, receipt, etc.) and GPS coordinates over a polling period to determine that the mobile device was proximate to Store C. For example, the stop detection utility may identify that the mobile device was travelling away from Store C at 3.5 mph at 12:05 pm; the mobile device received an email advertisement for Store C at 12:06 pm; the mobile device altered its course to travel toward Store C at 12:08 pm; the mobile device was travelling toward from Store C at 3.5 mph between 12:08 and 12:15; the Store C Wi-Fi "Store C" was detected at 12:15 pm; and the mobile device was travelling at between 0.1 and 1.8 mph (e.g., browsing speeds) between 12:15 μm and 12:45 pm. Based on this data, the stop detection utility may infer a visit state of "Visiting" for Store C. In response to the "Visiting" visit state, the stop detection utility may collect and store the sensor data for the third period.

At operation 304, a set of candidate venues may be generated. In aspects, the sensor data of a mobile device may be accessible to a venue retrieval utility, such as retrieval engine 202. The venue retrieval utility may parse the sensor data to identify venues and/or associated venue data. The venue data may be applied to a model or algorithm usable for venue-identification. For example, the venue data may be applied to a classification algorithm, such as a k-nearest neighbor algorithm. The classification algorithm may use the venue data to identify candidate venues that are within a specific proximity or density distribution of a location reported for a mobile device. For instance, the classification algorithm may utilize a geographical mapping service to identify every venue within 500 feet of a set of geographical coordinates. In at least one example, the classification algorithm may further incorporate factors such as venue popularity, venue visit recency, venue ratings, sales data (regional, seasonal, etc.), user preference data, etc. For instance, the classification algorithm may use a knowledge source to retrieve popularity information for one or more identified venues. The venues may then be sorted according to venue popularity and the most relevant/popular venues (for example, the 100 most popular venues) may be selected.

At operation 306, candidate venue data may be featurized to generate one or more feature sets. In aspects, data set of candidate venues may be provided to, or accessible by, a featurization component, such as feature engine 204. The featurization component may identify sensor data and/or venue data corresponding to one or more of the candidate venues. The sensor/venue data may be evaluated to generate a set of features indicative of characteristics (and corresponding values) associated with the candidate venues. For example, the featurization component may receive as input the following sensor data for one or more venues:

```
[{'frequency': 2412,
    'macaddress': u'e2:55:7d:3f:4b:e3',
    'signalstrength': −63,
    'ssid': u'IIDI',
    'timestamp': 1467215627},
 {'frequency': 2412,
    'macaddress': u'e2:55:7d:3f:4b:e2',
    'signalstrength': −63,
    'ssid': u'IDEAL-GUEST',
    'timestamp': 1467215627},
 {'frequency': 2462,
    'macaddress': u'54:3d:37:3e:03:18',
    'signalstrength': −78,
    'ssid': u'Thrillist',
    'timestamp': 1467215627}]
```

The featurization component may generate a set of scores corresponding to one or more elements or features in the sensor data. For example, the featurization component may use the above sensor data and/or historical data related to venues represented by the sensor data to generate one or more location-based scores. In a particular example, the location-based scores may represent evaluations of various Wi-Fi networks. For instance, the following location-based scores may be generated for the above sensor data:

```
[{Venue A:
    wifi_match_score_1: 0.50,
    wifi_match_score_2: 0.20},
 {Venue B:
    wifi_match_score_1: 0.90,
    wifi_match_score_2: 0.95},
 {Venue C:
    wifi_match_score_1: 0.35,
    wifi_match_score_2: 0.40}]
```

The sensor data and the set of scores may be used to generate and/or populate one or more feature vectors. For instance, the featurization component may organize a set of features and values into one or more types or categories, such as location, device, time, movement, etc. The organized features and feature values may be scaled and/or normalized. The normalized features and/or feature values may then be added to a feature vector. Feature vectors may be provided to, or made accessible to, one or more data analysis utilities and/or data stores.

At operation 308, one or more metrics may be generated for a set of candidate venues. In aspects, feature vectors may be accessible to a data analysis utility, such as probabilistic model engine 206. The feature vectors may comprise feature data and/or feature scores for a candidate set of venues. The data analysis utility may use one or more gradient boosting techniques to generate a probabilistic model. The probabilistic model may evaluate the feature vectors to generate one or more probabilities or confidence scores for each venue in a candidate set of venues. The probabilities/confidence scores may be indicative of the likelihood a venue corresponds to a particular set of coordinates, or the likelihood a venue is being visited. In examples, generating the probability/confidence score may include applying a scoring algorithm or machine learning techniques to the feature scores in the feature vector corresponding to each candidate venue. In a particular example, the scoring algorithm may include summing the feature scores of each candidate venue. In another example, the scoring algorithm may include applying a set of weights or multipliers to one or more feature scores. In aspects, candidate venues may be organized or ranked according to, for example, the probability/confidence scores generated by the probabilistic model.

At operation 310, a venue list may be calibrated to increase the accuracy of the venue list. In aspects, a calibration component, such as calibration engine 210, may access a venue list. The calibration component may apply one or more processing techniques to the venue list to increase the accuracy and/or confidence metrics of the venue selections, or reduce the number of venue selections. For example, the calibration component may compare one or more probabilities or confidence scores associated with candidate venues to a threshold confidence value. The threshold confidence value may represent a probability/confidence score that must be exceeded for a venue candidate to be included in a venue list. In examples, a threshold value may be determined or selected by applying, for example, one or more sets of heuristics to candidate venues. The heuristics may be used to generate a venue visit distribution for the candidate venues. The venue visit distribution may identify the frequency that a venue visit has been explicitly or implicitly reported for a period of time. In some aspects, the venue visit distribution for the venue candidates may be compared to the venue visit distribution for the training data. Based on the evaluation, a threshold value may be selected. Candidate venues below the threshold value may be removed from the list of candidate venues or noticeably diminished. For instance, candidate venues having a confidence score below 1% may be removed from the list of candidate venues, and candidate venues having a confidence score below 50% may be marked accordingly. The marking may include modifying the color, font or transparency of the candidate venues, or adding an indicator to the candidate venues.

In aspects, after a venue list has been calibrated (or as part of the calibration process), the calibration component may generate a list of the top 'N' venues. The list of the top 'N' venues may comprise one or more candidate venues from the venue list. The list of top 'N' venues may represent the venue candidates most likely to correspond to the location of a mobile device or to a visit event. In examples, the top 'N' venues may be determined by selecting a specific number of venue results, selecting venue results above a specific probability threshold, evaluating user selection data, etc. In some aspects, the list of top 'N' venues may be ranked and or organized according to one or more criteria. For example, a venue list may comprise "Store A" having a preliminary confidence score of 55%, "Store B" having a preliminary confidence score of 40%, and "Store C" having a preliminary confidence score of 5%. After this venue list has been refined, the refined venue list may comprise "Store A" having a final confidence score of 25%, "Store B" having a final confidence score of 75% and "Store C" having a final confidence score of 0%. The calibration component may calibrate the refined venue list such that the venues are listed in the order Store A, Store B, and Store C. In at least one example, the refined venue list may be ranked according to the final confidence score, such that Store B is the top-ranked venue and Store A is the second-ranked venue. A setting specifying that the top 2 venues are to be listed in the refined venue list may cause the Store C venue to be removed from the refined venue list. In some aspects, the refined venue list may be presented to a user via an interface, such as user interface 208.

Figure 4:
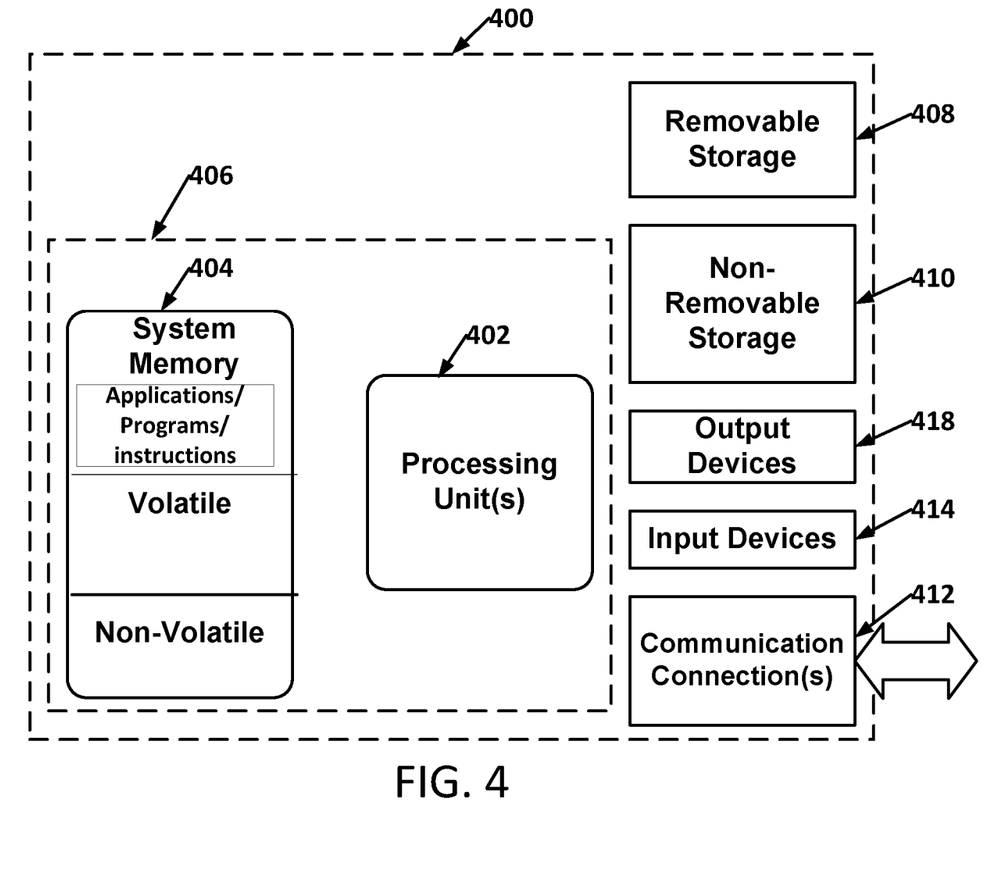
FIG. 4 illustrates one example of a suitable operating environment in which one or more of the present embodiments may be implemented.

FIG. 4 illustrates an exemplary suitable operating environment for the venue detection system described in FIG. 1. In its most basic configuration, operating environment 400 typically includes at least one processing unit 402 and memory 404. Depending on the exact configuration and type of computing device, memory 404 (storing, instructions to perform the venue detection embodiments disclosed herein) may be volatile (such as RAM), non-volatile (such as ROM), flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc. In embodiments, the connections may be operable to facility point-to-point communications, connection-oriented communications, connectionless communications, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for venue detection, the method comprising:
   receiving sensor data from a mobile device, wherein the sensor data is associated with a location of the mobile device;
   generating a venue list using the sensor data, wherein the venue list comprises at least a first venue and a second venue, wherein the first venue and the second venue are associated with the location of the mobile device;
   featurizing venue data associated with the first venue and the second venue to generate a feature set, wherein featurizing venue data comprises identifying corresponding venue data associated with at least a first candidate venue of the one or more candidate venues and corresponding sensor data to generate a set of features indicative of characteristics for at least the first candidate venue, and wherein a feature in the set of features is associated with a feature score based upon the corresponding sensor data;
   generating confidence metrics for the first venue and the second venue by applying the feature set to a probabilistic model;
   calibrating the venue list based in part on the metrics; and
   presenting the calibrated venue list and at least a portion of the confidence metrics via a user interface, wherein at least one of the first venue and the second venue corresponds to the location of the mobile device.

2. The method of claim 1, wherein the probabilistic model is an ensemble of decision trees generated using one or more gradient boosting techniques.

3. The method of claim 2, wherein the one or more gradient boosting techniques evaluate at least one of: venue age, venue popularity, proximity to other venues, historical accuracy of venue candidates, previous venue visit data, and user feedback.

4. The method of claim 1, wherein the sensor data is indicative of a visit by the mobile device to at least one of the first venue and the second venue.

5. The method of claim 1, further comprising:
   accessing a set of training data comprising previously received input data and corresponding output data;
   providing output data generated by the probabilistic model to an objective function;
   using the objective function to compare the output data generated by the probabilistic model to the output data in the training data; and
   based on the comparison, scoring the effectiveness of the probabilistic model.

6. The method of claim 4, wherein the confidence metrics indicate a probability a respective venue corresponds to the location of the mobile device.

7. The method of claim 1, wherein the generating the venue list comprises determining a first set of venues in a first proximity to the location of the mobile device, and wherein calibrating the venue list comprises determining a second set of venues in a second proximity to the location of the mobile device, wherein the second set of venues comprises fewer venues than the first set of venues.

8. A computer-readable storage medium encoding computer executable instructions which, when executed by at least one processor, performs a method for venue detection, the method comprising:
   receiving sensor data from a mobile device, wherein the sensor data is associated with a location of the mobile device;
   generating a venue list using the sensor data, wherein the venue list comprises at least a first venue and a second venue, wherein the first venue and the second venue are associated with the location of the mobile device;
   featurizing venue data associated with the first venue and the second venue to generate a feature set, wherein featurizing venue data comprises identifying corresponding venue data associated with at least a first candidate venue of the one or more candidate venues and corresponding sensor data to generate a set of features indicative of characteristics for at least the first candidate venue, and wherein a feature in the set of features is associated with a feature score based upon the corresponding sensor data;

generating confidence metrics for the first venue and the second venue by applying the feature set to a probabilistic model;

calibrating the venue list based in part on the metrics; and presenting the calibrated venue list and at least a portion of the confidence metrics via a user interface, wherein at least one of the first venue and the second venue corresponds to the location of the mobile device.

9. A system comprising:

one or more processors; and memory coupled to at least one of the one or more processors, the memory comprising computer executable instructions that, when executed by the at least one processor, performs a method for venue detection, the method comprising:

receiving sensor data from a mobile device, wherein the sensor data is associated with a location of the mobile device;

generating a venue list using the sensor data, wherein the venue list comprises one or more candidate venues corresponding to the location of the mobile device;

featurizing venue data associated with the one or more candidate venues to generate a feature set, wherein featurizing venue data comprises identifying corresponding venue data associated with at least a first candidate venue of the one or more candidate venues and corresponding sensor data to generate a set of features indicative of characteristics for at least the first candidate venue, and wherein a feature in the set of features is associated with a feature score based upon the corresponding sensor data;

generating metrics for the one or more candidate venues by applying the feature set to a probabilistic model; and calibrating the venue list based in part on the metrics.

10. The system of claim 9, wherein the sensor data comprises at least one of: geolocation data, positional data, Wi-Fi information, software information, hardware information, accelerometer data and time information.

11. The system of claim 9, wherein the sensor data is indicative of a visit by the mobile device to the one or more candidate venues.

12. The system of claim 9, wherein identifying one or more features comprises evaluating at least one of: venue age, venue popularity, proximity to other venues, historical accuracy of venue candidates and previous venue visit data.

13. The system of claim 9, wherein the probabilistic model is an ensemble of decision trees generated using one or more gradient boosting techniques.

14. The system of claim 13, wherein the probabilistic model determines a confidence score for one or more candidate venues in the set of venues, wherein the confidence score indicates a probability a corresponding venue corresponds to the location of the mobile device.

15. The system of claim 9, wherein generating the venue list comprises at least one of:

identifying venue information within the sensor data, and providing a set of geographical coordinates representative of the location to a venue determination utility.

16. The system of claim 9, the method further comprising:

accessing a set of training data comprising previously received input data and corresponding output data;

providing output data generated by the probabilistic model to an objective function; and using the objective function to compare the output data generated by the probabilistic model to the output data in the training data.

17. The system of claim 9, wherein calibrating the venue list comprises selecting a top 'N' venues, wherein the top 'N' venues represent the one or more candidate venues most likely to correspond to the location of a mobile device.

18. The system of claim 9, wherein the method further comprises:

presenting the venue list using a user interface;

receiving, via the user interface, user input associated with a presented venue list; and using the user input to modify the venue list.

19. The system of claim 9, wherein the sensor data is received in response to detecting at least one of a stop event by the mobile device and a visit event by the mobile device.

20. The system of claim 9, wherein the feature score is determined based upon a weight.

* * * * *